May 10, 1960   R. M. MAGNUSON ET AL   2,936,012
APPARATUS FOR LOOSENING THE SKINS OF FRUITS AND VEGETABLES
Original Filed Nov. 30, 1953   3 Sheets-Sheet 1

INVENTORS
GENEVIEVE I. MAGNUSON
EXECUTRIX OF THE ESTATE OF
ROY M. MAGNUSON, DECEASED.
TRAVER J. SMITH

BY  Allen and Thomy
ATTORNEYS

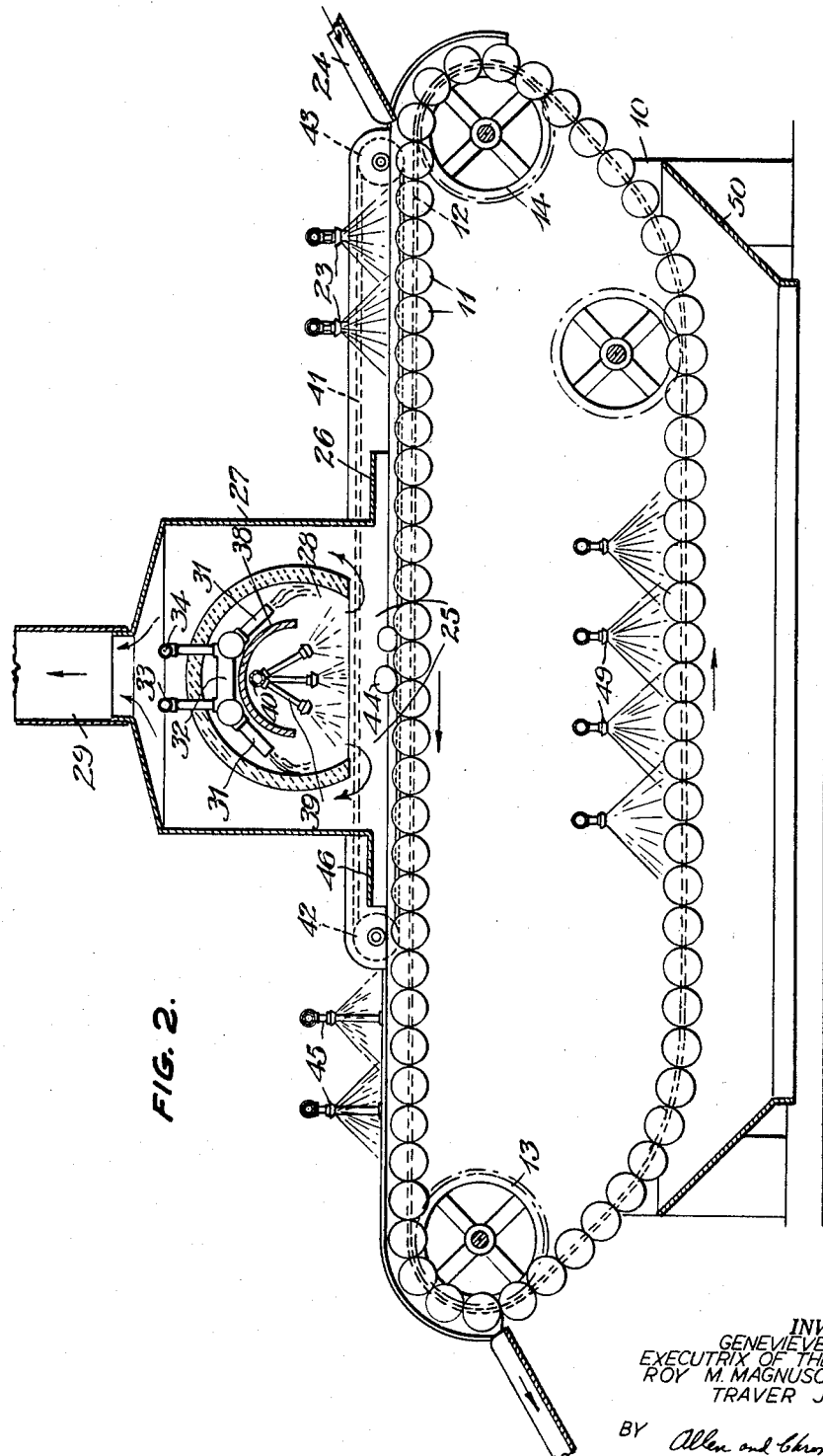

May 10, 1960 R. M. MAGNUSON ET AL 2,936,012
APPARATUS FOR LOOSENING THE SKINS OF FRUITS AND VEGETABLES
Original Filed Nov. 30, 1953 3 Sheets-Sheet 3
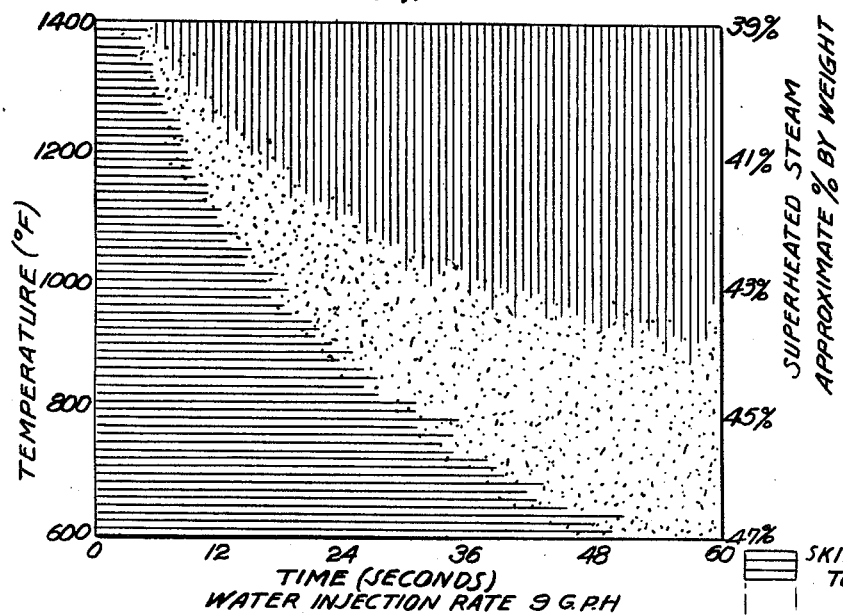
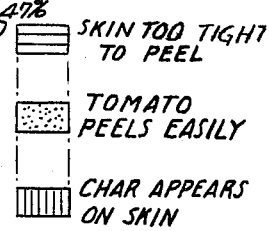
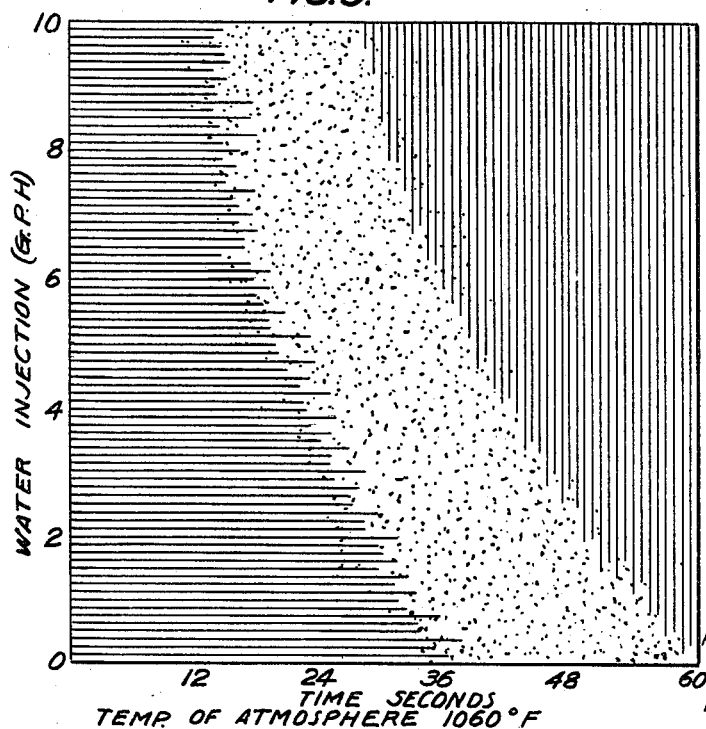
INVENTORS
GENEVIEVE I. MAGNUSON
EXECUTRIX
OF THE ESTATE OF
ROY M. MAGNUSON, DECEASED,
TRAVER J. SMITH
BY
ATTORNEYS United States Patent Office 2,936,012
Patented May 10, 1960

2,936,012

APPARATUS FOR LOOSENING THE SKINS OF FRUITS AND VEGETABLES

Roy M. Magnuson, deceased, late of Saratoga, Calif., by Genevieve I. Magnuson, executrix, Saratoga, and Traver J. Smith, San Jose, Calif., assignors, by direct and mesne assignments, of one-half to California Packing Corporation, a corporation of New York, one-fourth to Genevieve I. Magnuson, and one-fourth to Genevieve I. Magnuson, Robert Magnuson, and Lois J. Fox, as trustees Original application November 30, 1953, Serial No. 394,919. Divided and this application November 14, 1958, Serial No. 773,946

4 Claims. (Cl. 146—47)

This application is a division of our co-pending application, Serial No. 394,919, filed November 30, 1953.

This invention relates to high temperature peeling and is concerned more particularly with an improved apparatus of applying high temperatures to fruits and vegetables to effect loosening of the skin thereof in an advantageous manner without objectionable oxidizing, charring or the like to facilitate subsequent removal of the skin by manual or automatic methods.

Previous high temperature peeling machines have employed the use of steam under pressure to loosen the skin on certain fruits and vegetables and thereafter removed the peel. The use of the steam peeler is limited by the various properties of steam in that practical working pressure of saturated steam limits the temperature and vice versa. At atmospheric pressure, no great advantages are found over ordinary hot water loosening of the skins. At pressures above atmospheric there is required a steel chamber with complicated valve constructions for entrance and exit of the articles to be peeled and the temperature rise is definitely limited by commercially feasible pressure in equipment of this type.

The other type of high temperature peeling now available is known as flame peeling and while this provides very high temperatures in the neighborhood of 2700 degrees F. the equipment deteriorates rapidly at such temperatures so that frequent replacement is necessary. Also the product is charred in many cases and is always dehydrated to a certain extent. Thus, there is danger of carbon in the final product as well as obtaining a product that is too dry.

In accordance with the instant invention higher temperatures are provided than can be successfully obtained with steam pressure while remaining below temperature which will char the fruit or vegetable. At the same time the treating atmosphere is controlled to be substantially oxygen free so that no noticeable oxidation of the flesh of the fruit will occur. These higher temperatures are obtained at atmospheric pressure so that the apparatus can be relatively simple and inexpensive as compared with other apparatus, and specifically this is obtained by providing a controlled combustion process and applying the combustion products as a treating atmosphere to the fruit or vegetable being peeled. Preferably, the treating atmosphere is also conditioned for more effective heat transfer by the presence of moisture in the form of superheated steam.

Accordingly, it is a general object of the invention to provide a new apparatus for high temperature conditioning of fruit and vegetable articles for peeling.

Another object of the invention is to provide a new apparatus for high temperature conditioning of tomatoes to allow removal of a thinner skin than is possible with known processes.

Another object of the invention is to provide apparatus of the above character which permit the high temperature conditioning in a substantially oxygen free atmosphere.

Still another object of the invention is to provide apparatus of the above character in which the conditioning operation can be adjusted easily to the article to be peeled.

Still another object of the invention is to provide apparatus of the above character in which the articles being treated can be adjustably moved during travel through and conditioned in the heating zone to advantageously treat all surfaces of the articles.

Still another object of the invention is to provide apparatus of the above character in which the treating atmosphere contains moisture preferably in the form of superheated steam for more effective heat transfer to the articles being treated.

The above and other objects of the invention will become apparent from the following description of a preferred embodiment thereof as illustrated in the accompanying drawings, in which:

Figure 2 is an enlarged longitudinal sectional view of the apparatus with certain parts shown in elevation and others indicated schematically;

Figure 4 is a graph showing the effect of temperature and time on tomato skin loosening;

Figure 5 is a graph showing the effect of water injection on high temperature tomato peeling; and Figure 6 illustrates the key to the indicia used in Figures 4 and 5.

Figure 1:
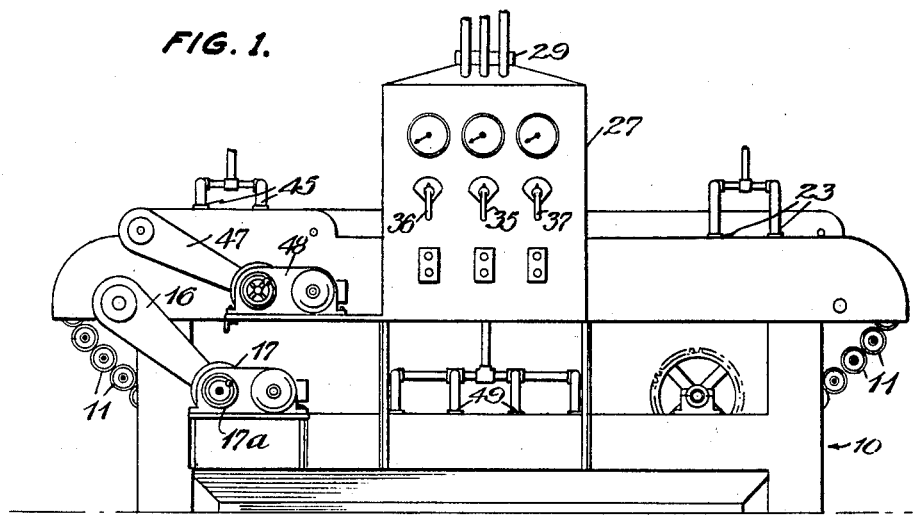
Figure 1 is a side elevational view of apparatus embodying the invention.

To enable a better understanding of the apparatus of the present invention, the general process employed by the apparatus will first be described.

In carrying out the process the article to be peeled is first subjected to the conventional washing and sorting operations so that clean defect-free articles are carried through the peeling process.

After the articles have been washed, sorted and treated in the desired manner in the preparation for the peel loosening operation, the articles are carried or transferred immediately into a heat application zone in which the articles are desirably supported for movement or rotation so that the shifting about of the articles will expose all of the skin uniformly to the heating medium. Desirably, both the rate of travel through the heating zone and the rate of movement or rotation of the articles while in the heating zone are controlled with respect to the specific article being peeled to provide the most desirable time of heating of the articles.

The heating zone itself is preferably substantially enclosed except for provision for entrance and exit of the articles. This heating zone may be connected to or disposed at one side of a combustion chamber which is provided with means for the introduction of (1) a fuel to be burned, such as gas, (2) air to effect the combustion of the fuel, and (3) moisture, with all of the elements individually controlled with respect to each other to obtain the desired result. The amount of gas and air introduced is such that substantially complete combustion of the fuel takes place while minimum excess oxygen over and above the amount necessary for complete combustion is introduced. The combustion flame is guided and directed toward but spaced from the articles being peeled to produce a flow of the products of combustion through the heating zone. A controlled amount of moisture is introduced into the combustion products in the form of steam, water or superheated steam. Water is preferably introduced as a high pressure spray, i.e., as a mist or fog, or water vapor such as steam may be injected. The water or other suitable liquid is flashed into superheated steam, or water vapor such as steam is superheated. In either event the superheated steam is mixed with the combustion products, and forms the heating medium or treating atmosphere for application to the articles being peeled. The amount of water sprayed into the flame for production of superheated steam at atmospheric pressure or the amount of injected superheated steam is controlled with reference to the desired moisture content to effect efficient heat application to the articles and with reference to the amount of moisture clinging to the articles or in the articles being peeled.

Figure 5 illustrates the effect of water injection on the conditioning of tomatoes for peeling. In this figure the horizontal hatching denotes the areas or conditions in which the skin of the tomato is too tight to peel, the vertical hatching denotes the conditions in which char appears on the skin while the intermediate dotted portion of the figure illustrates the conditions in which the tomato peels easily and in which no char appears. It will be seen that the introduction of moisture considerably shortens the time required for skin conditioning. It will be noted also that the amount of moisture introduced can be varied widely and still obtain desirable results up to the maximum amount of water that can be introduced in a given atmosphere and be maintained as superheated steam. The introduction of the moisture not only promotes efficient and rapid heat transfer from the atmosphere to the articles being treated, but also serves to stabilize the heat conditions of the atmosphere and to enable uniform treatment of articles over a long run.

Figure 3:
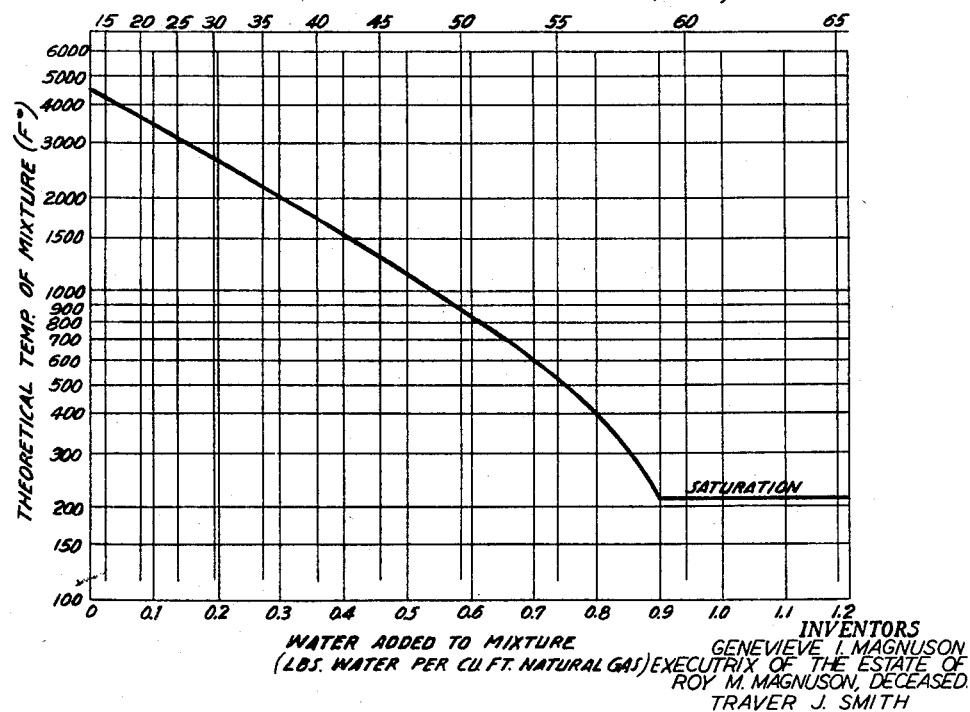
Figure 3 is a graph illustrating the theoretical conditions of the heating atmosphere plotted in logarithmic fashion to expand the curve portion of greatest interest under the present process.

The graph shown in Figure 3 illustrates a theoretical curve of the percentage superheated steam in the treating medium at temperatures between 4500 degrees F. and 212 degrees F. using natural gas as the fuel and for varying amounts of introduced water. The portion of the temperature range employed will lie preferably between about 800 degrees to 900 degrees F. and 1200 degrees to 1500 degrees F., depending on the article being treated, the time of treatment, and other operating conditions. It will be understood that actual temperatures fall below those of the curve due to heat losses, and the drop in temperature will depend largely upon the insulating efficiency of a particular installation.

Referring to Figure 4, it will be noted that an increase in temperature reduces the time in the treating atmosphere, while also reducing the time in which char will occur. As a result the selection of operating conditions of the process requires a balancing of the various conditions to obtain optimum results at a desirable cost figure. Obviously, also, these conditions will vary with different products and with different types of varieties of the same product. With respect to vine ripened Pearson tomatoes, satisfactory results are obtained with a temperature of the treating medium of between 1000 degrees and 1100 degrees F. with the corresponding time ranges shown in Figure 4, i.e., between about eighteen seconds to about twelve seconds. At these temperatures, we have found that the outer skin can be removed without carrying with it an intermediate layer of meaty material which usually adheres to the skin and is removed therewith.

Also the volume of gas being burned and the air necessary for complete combustion of the gas is controlled so that there is always a flow of combustion products past the articles being treated, thus they are completely enveloped during the heating operation by a hot oxygen free gaseous mixture or heating medium containing superheated steam. The flow of the atmosphere past the articles aids in the heat transfer operation. Preferably also the heating medium is controlled so that a portion thereof will flow out along the path of travel of the articles in entering and leaving the heating zone. As a result the articles may be subjected to and enveloped by this atmosphere for a selected amount of travel before entering and after leaving the actual heating zone. The exhaust gases may desirably effect a slight amount of preheating of the articles entering the zone and a slight amount of cooling of the articles in leaving the zone.

After the article has been subjected to the heating zone so that the skin is loosened and ready for removal, it is carried into a peel removing zone where the peeling can be carried out in a selected manner in accordance with the article being processed. With the processing of tomatoes, for example, the article may be hand peeled, or subjected to the action of suitable mechanical peeling means. With tomatoes and other articles the skin may be removed by a spray. In any event where desired, the material can be subjected to a spraying operation for cooling or for aid in skin removal after it leaves the heating zone and before or during the operation of peel removal.

In carrying out the process in the peeling of onions, for example, the treatment is carried out at a temperature of about 1060 degrees F., and a treating time of about forty-five seconds.

Referring to the drawings there is illustrated apparatus capable of carrying out the above described process and having certain novel details of construction as will be pointed out. Referring to Figures 1 and 2, there is illustrated a treating and peeling apparatus including a main frame 10 upon which a series of transverse agitating and peeling rolls 11 are carried by suitable chains 12 trained about suitable drive sprocket 13 at the discharge end of the machine and about idler sprockets 14 at the feed end thereof. The driving sprocket 13 is driven through a suitable drive connection 16 from a conventional form of variable speed motor drive unit 17 having a control wheel 17a for controlling its speed. The rolls 11 may be of any suitable construction such as metal.

At the feed end of the machine the rollers 11 travel through a preliminary feeding zone where washing sprays 23 of any desired construction may be provided for applying a spray of treating material to the articles being processed at a desired pressure after they are delivered to the rollers 11 from the feed chute 24. For example, these sprays may contain a wetting agent where a film of moisture is desired on the products. After the rolls 11 leave the preliminary treatment zone they pass beneath a tunnel element 26 formed as an extension of a flue construction 27 of box-like shape, they enter the heating peel loosening zone 25 at the open bottom side of the flue construction 27 and beneath a combustion chamber 28 having a thick insulated wall construction. The combustion chamber 28 may be substantially semi-cylindrical as illustrated so that the space between it and the flue construction 27 provides for the passage of exhaust gases upwardly to the central stack 29. Within the semi-cylindrical combustion chamber 28 there are provided two transverse arrays of burners 31 leading to a common manifold 32 to which fuel in the form of gas is introduced through the pipe 33. Air for combustion purposes is supplied through the pipe 34. The amount of gas admitted is controlled by means of a suitable valve under control of the manual lever 36 (Figure 1), while the amount of air is similarly controlled through a valve of conventional construction under control of the lever 37.

It is to be noted that the flame from the burners 31 is directed against the wall of the combustion chamber 28 and sweeps downwardly past an annular baffle 38 which is placed to separate the combustion zone adjacent burners 31 from a liquid introduction zone below baffles 38 in which a plurality of spray nozzles 39 of conventional construction are mounted. The nozzles 39 receive their supply of water under pressure from a manifold 40. The amount of water to be introduced to the sprays is controlled through a suitable valve construction having a manual control lever 35 (Figure 1). It will be noted that the positioning of the spray nozzles 39 with reference to burners 31 is such that the water is introduced into the flame after its initial combustion zone so that there is no danger of quenching the flame by the introduction of water. At the same time the water is introduced and flashed into superheated steam before the combustion products and steam are applied to the articles being carried through the heating zone on the rolls 11.

It will be understood that the above structure may be modified for certain fruit and vegetable articles to place the combustion chambers in a more remote location with respect to the treating zone. Also the point of introduction of moisture can be varied to introduce the water into the combustion products in a location spaced from or remote from the zone of flame propagation.

To effect controlled application of the heating medium to the articles by effecting controlled shifting or rotation of the articles, the rolls 11 are provided with suitable sheaves or may be grooved to receive an overhead V-belt 41 which is trained about respective driving and idler pulleys 42 and 43. The pulley 42 is driven from a conventional variable speed drive unit (not shown) similar to the unit 17. The belt 41 extends from the feed end of the machine past the treating zone. By controlling the speed of the belt 41, the rate of shifting or rotation of the articles 44 may be controlled during treatment thereof.

As the rolls 11 with the articles thereon leave the heating zone they pass beneath a second tunnel element 46 and enter the peel removal zone below sprays 45. If desired the sprays 45 above this zone may be used for removal of loose skin or peel. During this spray treatment the articles are moved or rotated by rotation of their supporting rolls under control of an overhead V-belt drive structure 47 having a variable drive unit 48.

After the rollers 11 pass over the discharge end of the machine and travel along the return stretch, they are subjected to sprays from the nozzles 49 to flush the rolls and remove the peel. The waste water and peel are discharged into the drain trough 50 of the machine.

It will be noted that with the control levers 36 and 37 properly adjusted as to the introduction of gas and air to provide the desired combustion characteristics, the water valve control layer 35 can be adjusted to vary the rate of water injection and thereby control the temperature of the treating atmosphere.

While we have shown and described a preferred embodiment of the invention, it will be apparent that the invention is capable of further variation and modification and its scope should be limited only by the scope of claims appended hereto.

We claim:
1. In apparatus for treating fruit and vegetable articles, means forming a substantially enclosed treating zone, a conveyer traveling through said zone forming means, means mounted adjacent to said zone forming means for establishing a treating medium in said zone forming means, including a combustion chamber, means including conduit means connected to said combustion chamber for controlling the flow of fuel and air to the combustion chamber, means mounted intermediate to the combustion chamber and the treating zone for directing the products of combustion from the combustion chamber to the treating zone, and means mounted adjacent said treating zone for introduction of liquid into the products of combustion before arrival thereof at said treating zone.

2. In apparatus for treating fruit and vegetable articles, means forming a substantially enclosed treating zone, a conveyer traveling through said zone forming means mounted adjacent to said zone forming means for establishing a treating medium in said zone forming means including a combustion chamber, means including conduit means connected to said combustion chamber for controlling the flow of fuel and air to the combustion chamber, means mounted intermediate the combustion chamber and the treating zone for directing the products of combustion from the combustion chamber to the treating zone forming means and pressure means mounted adjacent said treating zone for introduction of liquid as a fine spray into the products of combustion before arrival thereof at said treating zone.

3. In apparatus for treating fruit and vegetable articles, means forming a substantially enclosed treating zone, a conveyer traveling through said zone forming means mounted adjacent to said zone forming means for establishing a treating medium in said zone forming means including a combustion chamber, means including conduit means connected to said combustion chamber for controlling the flow of fuel and air to the combustion chamber, means mounted intermediate the combustion chamber and the treating zone for directing the products of combustion from the combustion chamber to the treating zone forming means, pressure means mounted adjacent said treating zone for introduction of liquid as a fine spray into the products of combustion before arrival thereof at said treating zone forming means, and said pressure means including means for controlling the rate of introduction of liquid.

4. In apparatus for treating fruit and vegetable articles, means forming a substantially enclosed treating zone, a conveyer traveling through said zone forming means mounted adjacent to said zone forming means for establishing a treating medium in said zone forming means including a combustion chamber, means including conduit means connected to said combustion chamber for controlling the flow of fuel and air to the combustion chamber, means mounted intermediate the combustion chamber and the treating zone for directing the products of combustion from the combustion chamber to the treating zone forming means, and means mounted adjacent said treating zone for introduction of moisture into the products of combustion.

References Cited in the file of this patent
UNITED STATES PATENTS

| | | |
|---|---|---|
| 1,236,690 | Dunkley | Aug. 14, 1917 |
| 1,992,398 | Ryder | Feb. 26, 1935 |
| 2,218,466 | Gray et al. | Oct. 15, 1940 |
| 2,308,902 | Weller | Jan. 19, 1943 |
| 2,445,881 | Hemmeter | July 27, 1948 |
| 2,515,025 | Vahl et al. | July 11, 1950 |
| 2,631,628 | Martin | Mar. 17, 1953 |